June 17, 1969

J. H. BORNZIN 3,450,033

UNITIZED BALING, BALE ACCUMULATING, AND TRANSPORTING APPARATUS

Filed April 28, 1967

INVENTOR
JAMES H. BORNZIN

ATTY

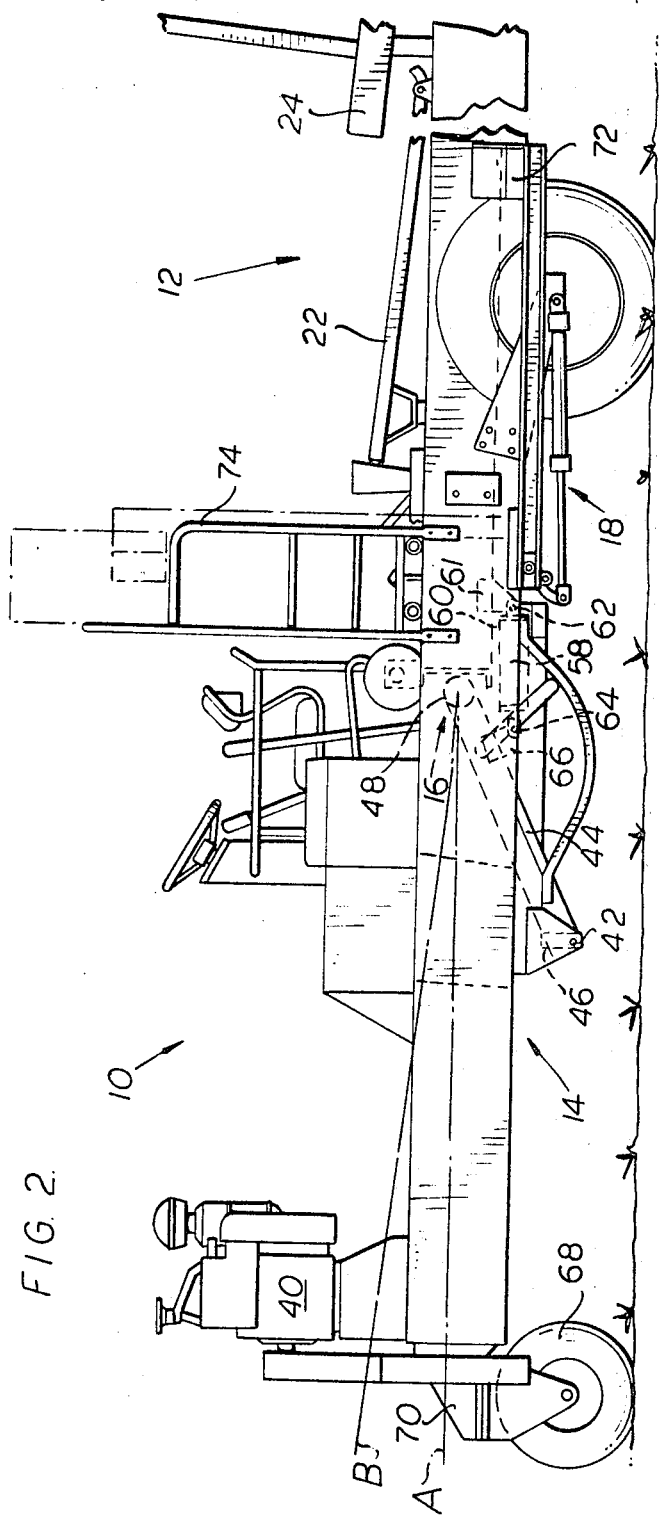

United States Patent Office 3,450,033
Patented June 17, 1969

3,450,033
UNITIZED BALING, BALE ACCUMULATING, AND TRANSPORTING APPARATUS
James H. Bornzin, La Grange, Ill., assignor to International Harvester Company, Chicago, Ill., a corporation of Delaware
Filed Apr. 28, 1967, Ser. No. 634,599
Int. Cl. A01d 90/00, 15/14
U.S. Cl. 100—100                    6 Claims

ABSTRACT OF THE DISCLOSURE

An agricultural apparatus including in combination a baler and a dirigible, self-propelled bale wagon provided with automatic bale accumulation facilities. The baler is pivotally connected to the front of the bale wagon and is movable by a hydraulic ram between a ground-engaging, baling position and an elevated, transport position.

BACKGROUND OF THE INVENTION

The present invention relates generally to an agricultural apparatus and more specifically to a baler-bale wagon combination.

Presently known bale wagons belong to two general types: (1) the ground pickup bale wagon (see U.S. Patent No. 2,848,127 issued to G. E. Grey) and (2) the baler-bale wagon combination (see U.S. Patent No. 3,159,287 issued to H. R. Stroup). (For convenience of illustration the former type will be referred to as the Grey bale wagon and the latter as the Stroup bale wagon.) The Grey bale wagon operates entirely independent of the baler, its main function being to transport bales from the field to a central storage area. The Stroup bale wagon operating in conjunction with a conventional baler is designed to accumulate bales in the field. Significantly, neither type of machine is capable of handling hay from the window to the central storage area.

SUMMARY OF THE INVENTION

The present invention provides for a baler-bale wagon combination operable as a unit to automatically handle hay from the window to the central storage area. A novel feature of this invention resides in the portability of the combination after a load of bales has been accumulated. Thus as the disclosure develops it will be appreciated that the novel combination of a baler and bale wagon operating as a unit provides three important functions which heretofore require two separate units: (1) form bales, (2) accumulate bales and (3) transport the accumulation of bales to a central storage area.

The objects of the present invention are briefly as follows:

(1) Provide a portable labor-saving baling and bale accumulating apparatus.
(2) Provide a means for automatically handling hay from the windrow to a central storage area.
(3) To provide a single unit for baling, accumulating bales and transporting the accumulation to a central storage area.

DRAWINGS

FIGURE 2 is an elevational view of the baler-bale wagon shown in FIGURE 1.

DESCRIPTION

Figure 1:
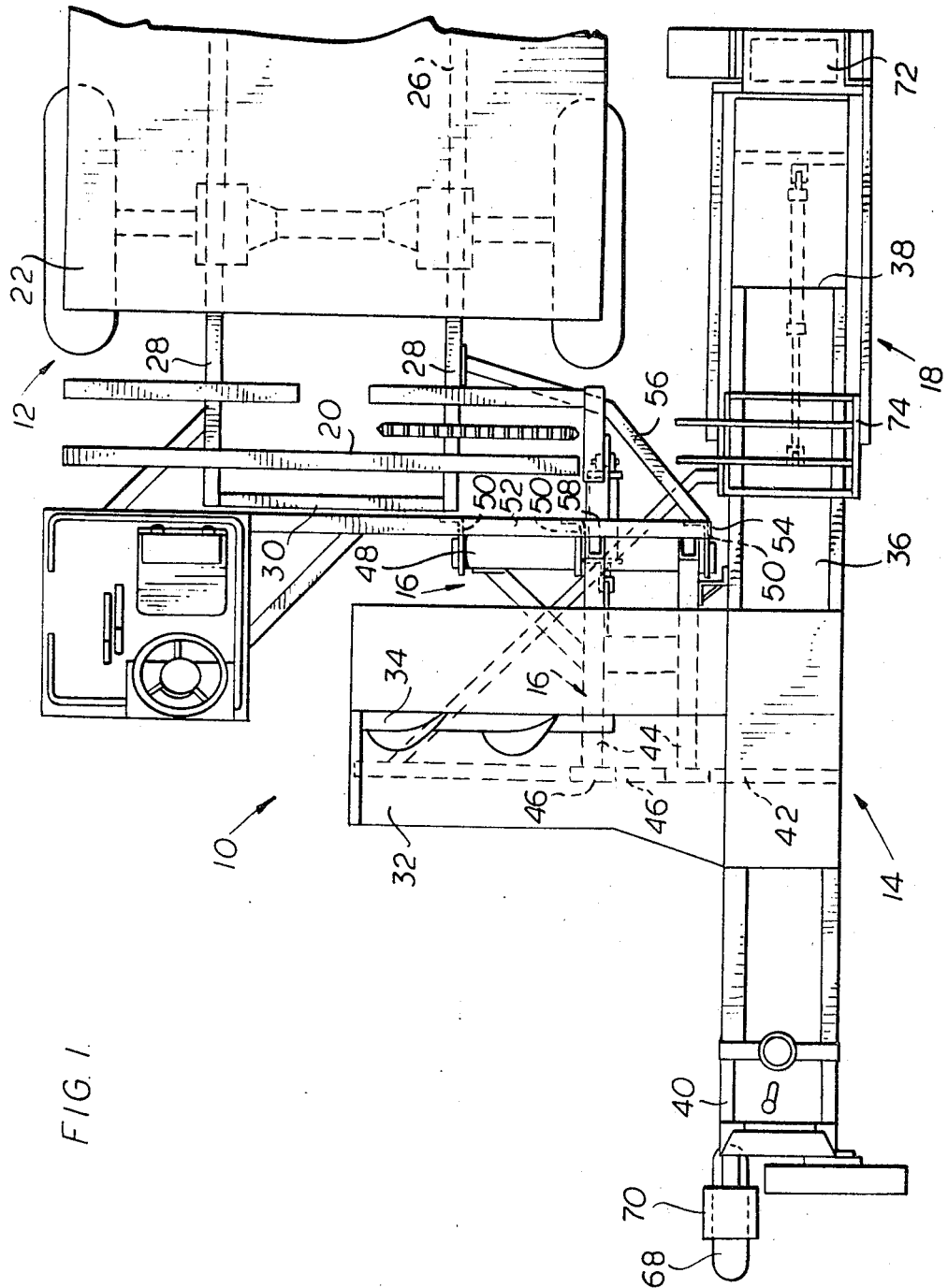
FIGURE 1 is a plan view of the baler-bale wagon combination.

A novel baler-bale wagon combination 10 constructed in accordance with the principles of the present invention is shown in FIGURES 1 and 2 and comprises generally a bale wagon 12, a baler 14, a support frame 16 interconnecting the bale wagon 12 and baler 14, and a bale transfer means 18. The bale wagon 12 may be any one of the several known models. For purposes of illustration the present invention is described in connection with the Grey bale wagon.

The components of the bale wagon 12 includes generally a receiving platform 20, a stack forming bed 22, and a stack storage bed 24, all arranged in tandem and carried by chassis 26. The chassis 26 is a frame structure having a pair of longitudinally extending members 28, 28 interconnected at their forward end by crossing member 30.

The baler 14 is conventional except for modifications of the support means which will be discussed presently. The baler 14 includes the conventional hay-receiving apron 32, a cross feed auger 34, and a bale compression chamber 36. As is common to such balers, hay is picked up from the windrow by the receiving apron 32, cross fed into the path of a reciprocating plunger (not shown) which compresses the hay in the bale chamber 36, the bale being discharged through a rearwardly facing opening 38 in the form of bound bales. The various components of the baler 14 are powered by a baler engine 40 mounted on the baler 14.

The only difference between a conventional baler and the one disclosed herein is the support means. The conventional baler is wheel-supported, whereas the baler contemplated herein is supported by the bale wagon chassis 26. A transverse axle 42 provides a bottom support for baler 14 but instead of being wheel-mounted, is carried by a lifting frame 16 which is supported by chassis 26. The lifting frame 16 includes a pair of laterally spaced lifting arms 44, 44 having their forward ends rigidly connected to an intermediate portion of axle 42 as at 46, 46. The lifting arms 44, 44 have their opposite ends secured to a pivot tube 48. The pivot tube 48 extends transverse to the direction of movement and is journalled to three laterally spaced brackets denoted by the reference numeral 50. The brackets 50 are welded to a transverse channel member 52 which extends laterally from cross member 30 of the chassis 26. The channel member 52 terminates at a point 54 laterally removed from the bale wagon 12. Additional rigidity is provided by means of brace members 56 which interconnect the outer extremity 54 of channel 52 and longitudinal member 28 of the chasis 26.

With reference to FIGURE 1, it will be seen that the general disposition of the baler 14 in relation to the bale wagon 12 is as follows: the hay-receiving apron 32 and the cross feed means 34 are disposed in front of the bale wagon 12 and the bale chamber 36 is disposed beside the receiving platform 20. This arrangement provides for a compact and rigid unit.

As best seen in FIGURE 2, pivotal movement of the baler about pivot tube 48 is attained by means of a conventional hydraulic ram 58. The ram 58 has a cylinder 60 connected to the receiving platform 20 by means of an anchor plate 61 and a piston rod end 64 connected to one of the lifting arms 44 through an anchor plate 66. Thus it will be appreciated that the baler 14 is pivotable about pivot tube 48.

The pivot tube 48 is located rearwardly of the center of gravity of the baler 14 so that when the piston rod 64 is in the retracted position the weight distribution of the baler 14 causes it to pivot counterclockwise as viewed in FIGURE 2. The extent of the counterclockwise pivoting is restricted by a wheel 68 attached to the front of the baler 12 by a caster arrangement 70. The diameter of the wheel 68 is such that when the piston rod 64 is in the retracted position the baler 14 will be substantially horizontal to the ground and in the baling position. In the baling position the axis of the bale chamber is that denoted generally by the reference A. The baler 14 is pivoted to a transport position by hydraulically extending the piston rod 64. This forces lifting arms 44 to pivot about pivot tube 48. The baler 14 is pivoted in a clockwise direction as viewed in FIGURE 2 to a portable position wherein the caster wheel 68 is suspended above the ground and the axis of the baling chamber is that denoted by reference B.

The transfer means 18 includes generally a bale-receiving carriage 72 disposed opposite bale discharge 38 for receiving bales discharged therefrom, and a bale deflector frame 74 mounted above bale chamber 36 and aligned with the bale carriage 72 to receive bales delivered thereby. The transfer mechanism 18 is described in detail in assignee's copending application Ser. No. 634,598.

OPERATION

In describing the operation of the present invention, let it be assumed that the baler-bale wagon unit 10 is being driven in the field with the hay-receiving apron 32 in registry with windrows of hay. The baler 14 is in the horizontal baling position supported at its front end by the ground-engaging caster wheel 68. The hay is picked up and cross fed into the path of the reciprocating chamber which compresses the hay in the bale chamber 36. The hay is discharged in the form of bales through opening 38 onto the carriage 72 (solid line position of FIGURE 2) which pivotally carries the bale upwardly and forwardly depositing it upended in bale deflector frame 74 (broken line position FIGURE 2.) The bale is deflected onto the bale wagon receiving platform 20 whereupon the stacking mechanism of the particular bale wagon employed becomes operative upon the bale.

Succeeding bales are similarly handled until a complete load is accumulated on the storage bed 24. The operator then actuates the means for moving the baler from the horizontal ground-engaging baling position to an elevated transport position. This may be done by manually opening a conventional hydraulic circuit to the hydraulic ram 58. The piston rod 64 extends outwardly from the cylinder 60 forcing lift arms 44,44 to pivot about the axis of the pivot tube 48. Pivotal movement about the axis of pivot tube 48 elevates the front end of baler 14, suspending caster wheel 68 and lowers the rear end. The rearwardly extending carriage 72 may be transported in the broken-line position of FIGURE 2 which shortens the rearward extent of the transfer mechanism 18.

The baler-bale wagon unit is then driven to a central storage area where the bales are removed from the unit according to the scheme of operation of the particular type of bale wagon used. Summarizing the operation, the single unit 10 forms bales, accumulates bales, and transports the accumulation of bales.

It has thusly been demonstrated that the novel unit disclosed herein accomplishes its main object—automatically handles hay from the windrow to a central storage area.

What is claimed is:
1. An agricultural apparatus comprising:
   a chassis;
   a bale-receiving bed mounted on said chassis;
   a baling machine mounted on said chassis proximate to said bale-receiving bed;
   means mounting said baling machine on said chassis for pivoting movement about a horizontal axis disposed transversely to said chassis; and
   power means for pivoting said baling machine about said axis between a horizontal operative position and an inclined transport position.
2. The subject matter of claim 1, including ground support means secured to said baling machine forwardly of said axis for rollably supporting said baling machine on the ground when said machine is disposed in its operative position and adapted to be suspended above the ground when said machine is in its inclined transport position.
3. The subject matter of claim 1, wherein said means mounting said baling machine on said chassis includes arm means extending forwardly from said chassis for pivoting movement about said axis, the forward end of said arm means being coupled to said baling machine whereby said machine is moved between its operative and transport positions in response to pivoting of said arm means.
4. The subject matter of claim 3 wherein said power means includes a hydraulic cylinder coupled between said chassis and said arm means for pivoting said arm means about said axis.
5. An agricultural apparatus comprising:
   a chassis including a bale-receiving bed disposed proximate to the forward end thereof;
   a baling machine mounted on said chassis and including a hay-receiving apron disposed adjacent to the front of said bed and a baling chamber disposed perpendicularly to said apron and adjacent to a side of said bed;
   means mounting said baling machine on said chassis for pivoting movement about a horizontal axis disposed along the forward edge of said bed rearwardly of said apron; and
   power means for pivoting said baling machine about said axis between a horizontal operative position and an inclined transport position.
6. The subject matter of claim 5, including ground support means secured to said baling machine forwardly of said axis for rollably supporting said baling machine on the ground when said machine is disposed in its operative position and adapted to be suspended above ground when said machine is in its inclined transport position.

References Cited
UNITED STATES PATENTS

| | | | |
|---|---|---|---|
| 2,316,435 | 4/1943 | James | 214—6 XR |
| 2,327,067 | 8/1943 | Russell | 100—179 XR |
| 2,467,717 | 4/1949 | Acton | 100—7 XR |
| 2,848,127 | 8/1958 | Grey | 214—510 |
| 3,159,287 | 12/1964 | Stroup | 214—6 |
| 3,352,229 | 11/1967 | Morse | 100—38 |
| 3,367,518 | 2/1968 | Bishop | 214—6 |

BILLY J. WILHITE, *Primary Examiner.*

U.S. Cl. X.R.

56—474; 214—6; 100—179, 188